L. Yale Jr.,
Locks,
No. 1,469, Fig: 1. Reissued Apr. 28, 1863.
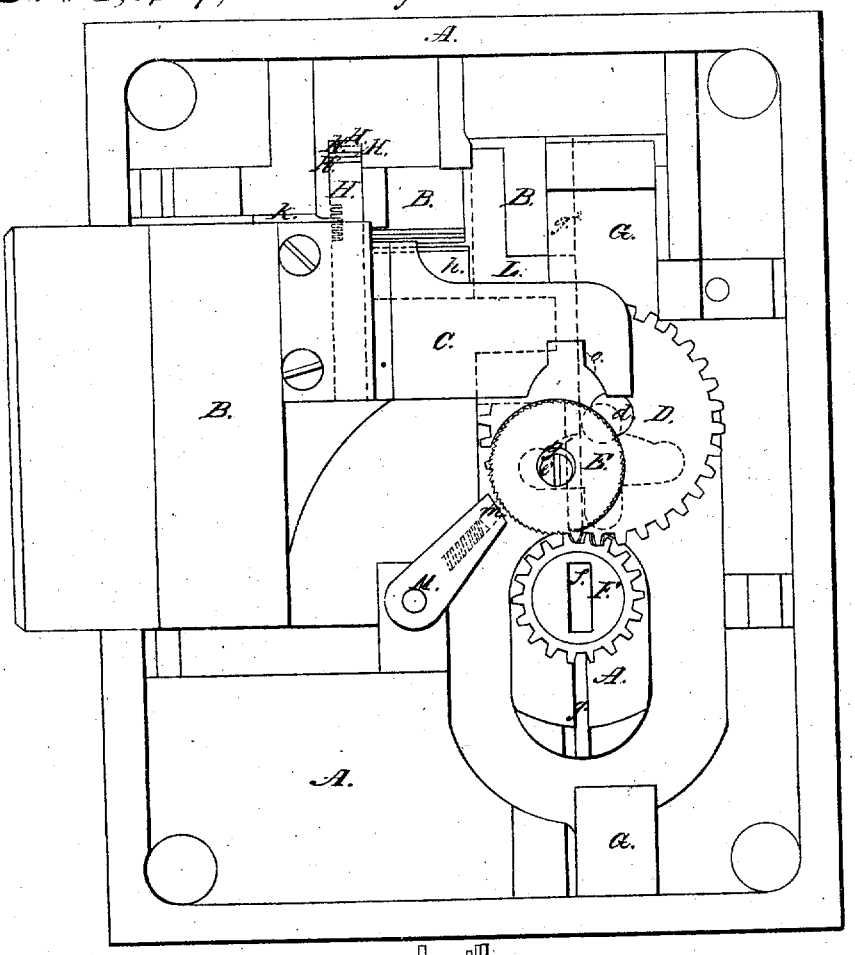
Fig: 8.
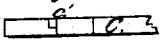
Fig: 7.
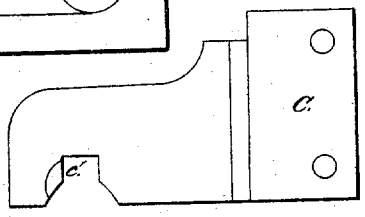
Fig: 3.
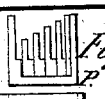
Fig: 2.
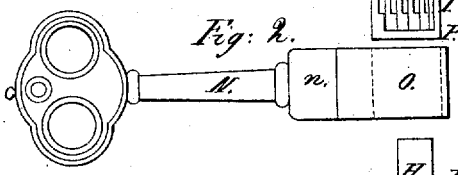
Fig: 6.
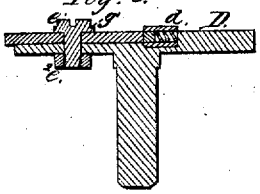
Fig: 4.
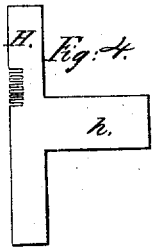
Fig: 5.
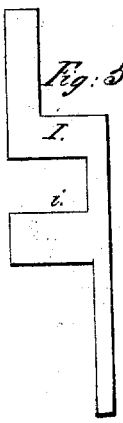
Witnesses.
John Yale
John Koslin
Inventor.
Linus Yale Jr

UNITED STATES PATENT OFFICE.

LINUS YALE, JR., OF SHELBURNE FALLS, MASSACHUSETTS, (FORMERLY OF PHILADELPHIA, PENNSYLVANIA.)

IMPROVEMENT IN LOCKS.

Specification forming part of Letters Patent No. 32,331, dated May 14, 1861; Reissue No. 1,469, dated April 28, 1863.

*To all whom it may concern:*

Be it known that I, LINUS YALE, Jr., formerly of Philadelphia, Pennsylvania, but now residing at Shelburne Falls, Massachusetts, have invented certain new and useful Improvements in Locks; and I do hereby declare that the following, taken in connection with the drawings, is a full, clear, and exact description thereof.

In the drawings, Figure 1 is a plan of the lock; Fig. 2, a plan of the key; Fig. 3, a plan of the key-bit; Fig. 4, a plan of a movable or permutation stump; Fig. 5, a plan of a tumbler; Fig. 6, a section through what I term the "disconcerting apparatus" and its auxiliaries; Fig. 7 is a plan of the bolt-talon, and Fig. 8 an elevation of part thereof.

The nature of my invention consists in inserting between that part of the key of a lock which is outside of the lock and the bolt a contrivance which I call the "disconcerting apparatus," which prevents or disconcerts all attempts to establish a fixed or certain relation between the position of the key and the position of the bolt when it is attempted to pick the lock; and by "key" I mean any contrivance, be it in one or more parts, which when moved outside of the lock communicates motion to the bolt.

The mechanical device by which my invention is reduced to practice is a piece of metal so arranged as to move either by force of friction or by a ratchet or some other positive mover, and lying somewhere between that part of the key which is outside of the lock and the bolt itself, and so applied that the same positions of the key shall be followed by different positions of the bolt at and about the time when the stump or stumps are brought in contact with the tumblers. A very successful modern method of lock-picking depends for its success upon first distinguishing the tumblers, so as to know upon which tumbler the stump is bearing most heavily, and then, afterward, feeling out each tumbler, and this process is usually conducted by applying a spring or weight to the key or instrument taking the place of a key, and then measuring the angular position to which the key is revolved when the stump brings up against the tumblers. This measurement is made by means of an index attached to the key, and, if necessary, multiplying a few thousand times the differences of size of the tumblers, or the variation in size of different parts of the same tumbler; and as it is impossible to make all the tumblers and each part of every tumbler of precisely the same width, the differences of size are made palpable by the indicator or index, and a skillful manipulator picks the locks.

When the plans of carrying away the key-bit or tumbler-adjuster from the key, and of shutting up the key-hole by mechanism before the key moved so far as to act on the bolt were invented, thus preventing a pick operated by hand from reaching the tumblers, while end-play was communicated to the bolt, it was supposed that picking was thereby prevented; but a skillful pick-lock, by means of experimental bits tried one after the other, feels out a lock almost as certainly as with a pick, and hence the carrying away of the bit by mechanism or the closure of the key-hole before the bit comes in contact with the tumblers, or both combined, only delay picking and do not prevent it; hence it follows that my disconcerting contrivance is applicable and important in such locks, and also in those which have no key-hole or aperture for entering a bit.

In the drawings I have represented my invention as applied to a removable bit-closing key-hole lock of the permutation variety, and in them the lock-case is shown at A A, the bolt at B B, and the tumblers at I, with notches or gates *i*, into which may enter the projections *h* of the permutation-stumps H. The tumblers rise and fall when operated upon by the bit and draw-down frame, and the permutation-stumps are moved up and down by the tumblers so long as in their grasp, and sidewise by the bolt, and are anchored in their set position by a stationary knife-edge, K. The key-moving and draw-down slide G lies beneath the talon-plate C, and has attached to it a hook, $g^2$, projecting over the tumblers, and a punch, *g*, the latter sliding in a case, groove, or chamber which at times contains and guides the key-bit. This slide has a slot in it (represented by dotted lines) under the cog-wheel D and disk E. A cog-wheel, F, lies under the key-hole, and is sustained in place by a collar or by its boss or hub projecting into a circular hole in the lock-plate. This wheel has an aperture, *f*, through it, which is a continuation of the key-hole and leads to the groove in which the bit slides. This cog-wheel gears into another, (marked D,) and this latter has projecting from it a pin, $e^2$, which enters the slot in the draw-down slide, moving the latter when the cog-wheel is revolved. If the lock were without my present improvements, another pin would project from the other side of the cog D, and when that cog was revolved would take into the talons and actuate the bolt. The key-shank N has on it a rectangular block fitting the aperture in cog F, and is connected by a swivel-pin in a well-known way to a pod, O, and this pod is slotted out to receive the bit P.

In locking this lock the key-shank is inserted and revolved, thus turning both the cogs. The pod lies stationary in the groove. The pin $e^2$ lifts the draw-plate and the punch *g*, which latter elevates the bit out of the pod and against the tumblers; the latter rise, elevating with them the stumps, but before they are lifted fully the punch *g* fills the groove and closes the key-hole. When the tumblers are fully lifted, the other pin on cog D takes into the bolt-talons and shoots the bolt, which in its advance carries with it the stumps and deposits them upon the knife-edge. A further rotation of the key-shank hauls down the draw-down slide, which shoves down the tumblers, and they in turn force the bit into the pod, the punch retreating before it. When the bit is in place in the pod, the shank, bit, and pod can be removed.

In this form of lock the key is composed of the shank, the rectangular piece, the two cog-wheels, and the pin which engages with the bolt-talons and moves the bolt, and as thus described all the parts are known, and some of them are described and claimed as of my invention in patents granted May 6, 1851, and June 12, 1860.

In order to vary the relative positions of the bolt and the key at and about the time that the stumps would strike the tumblers if the latter were not properly set, thus disconcerting a lock-picker and rendering valueless the indications of an index applied to the key-shank, and therefore preventing picking by means of experimental bit, I introduce into the lock my disconcerting contrivance, which is in the present instance, and in the form I prefer, a turning eccentric, *e'*, applied in place of the ordinary bolt-moving pin. This eccentric is made in one piece with a small shaft, which is free to revolve in the cog D. When the cogs are rotated, it strikes against the bolt-talon, and by friction against the talon rotates slightly on its own axis, and as it rotates it varies the distance between the center of cog D and the acting part of the eccentric or the spot of contact of the eccentric against the talon; hence it follows if the key-shank, and consequently the cog, be oscillated, that the bolt, although following these oscillations, will at each time that the stumps strike the tumblers require a different angular position of the key-shank; or, in other words, the key will have to be moved through varying parts of a revolution to bring the bolt to the same position.

If an index were applied to the key, its indications would vary at each oscillation, and even when the stumps at each time bore hardest on the same tumbler; hence all trials by experimental bits aided by an index are disconcerted and the lock is a safe one. A piece of metal which is interposed between that part of the key outside of the lock and the bolts, and which moves, when force is applied to shoot the bolt backward, so as to unlock the lock, in such manner that by virtue of its motion the same range of motion of the bolt shall be accompanied by and correspond to different amounts of turn or motion of the key-handle, therefore constitutes my disconcerting apparatus or contriv-ance.

As the eccentric-shaft might stick fast, so that the eccentric would not move, and as the eccentric might become flattened by long wear or sudden jars, I have thought it advisable in the most complete form to give to it an enforced motion, or a motion not depending upon friction. This enforced motion is shown in the drawings as produced by applying to the eccentric-shaft a disk, F, which turns with the shaft. This disk has ratchet-teeth cut around its periphery, and into these teeth takes a small spring dog or pawl, *m*, mounted on a socket, M. As the cog-wheel D is rotated in one direction, carrying the eccentric and disk E with it, this dog slides over the teeth, and as the disk rotates in the other direction the dog takes into the teeth and moves the disk and the eccentric, so as to apply a new [illegible] or spot of contact to the talons. In order to prevent the eccentric from slipping backward by friction of the dog, I apply upon the cog D a small spring-holding pawl, *d*, which also takes into the teeth on the disk and prevents it from turning backward.

As it is sometimes advisable, when the true key is used, to return the bolt, when fully unlocked, always to the same position, I locate beneath the eccentric a concentric pin, *g'*, which may be made in one piece with the eccentric. This pin *g'* is so arranged as to turn in a recess of the talon, as at *c'*, and acts upon the talon only after the stumps have entered the gates of the tumblers.

When the disconcerting contrivance does not shoot the bolt fully backward, the concentric pin as it emerges from its recess strikes the talon and completes the backward motion of the bolt.

My improvement may be applied to almost any kind of lock in the herein specifically described or in other forms, so as to effect substantially the same object—*i. e.*, a varying indication of the amount of movement or position of the bolts when any attempt is made to ascertain its position by an index—and this disconcerting contrivance may have various locations between various parts of the lock, so long as it produces the required effect, and lies between the bolt and the contrivance, whatever it may be, that is located outside of the lock, and which when moved imparts motion to the bolt.

I claim as of my own invention—

1. A disconcerting contrivance, substantially such as specified, arranged and acting under a mode of operation, substantially as described, to attain substantially the object herein set forth.

2. In combination with a disconcerting contrivance, substantially such as is described, an apparatus, substantially such as is herein set forth, for imparting to the same an enforced motion when a key-handle is moved, the combination being and operating as hereinbefore described.

3. In combination with a disconcerting contrivance, substantially such as is described, a contrivance which always shoots the bolt back to the same position when the lock is fully unlocked under a mode of operation substantially as hereinbefore recited.

In testimony whereof I have hereunto set my hand on this 17th day of March, A. D. 1863.

LINUS YALE, JR.

In presence of—
L. JOHN YALE,
JOHN HOSKIN.